United States Patent
Cutaia

(10) Patent No.: US 7,426,221 B1
(45) Date of Patent: Sep. 16, 2008

(54) PITCH INVARIANT SYNCHRONIZATION OF AUDIO PLAYOUT RATES

(75) Inventor: Nicholas J. Cutaia, Brighton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1123 days.

(21) Appl. No.: 10/358,406

(22) Filed: Feb. 4, 2003

(51) Int. Cl.
*H04J 3/06* (2006.01)

(52) U.S. Cl. .................. 370/516; 370/517; 370/231; 370/232; 370/233; 370/234; 370/235

(58) Field of Classification Search ............. 370/516, 370/517, 229, 230, 230.1, 231–234, 235, 370/235.1, 241, 242, 244, 245, 250, 252, 370/253

See application file for complete search history.

(56) References Cited

U.S. PATENT DOCUMENTS

| | | | | | |
|---|---|---|---|---|---|
| 4,700,391 | A | * | 10/1987 | Leslie et al. | 704/207 |
| 4,864,620 | A | | 9/1989 | Bialick | 381/34 |
| 5,386,493 | A | | 1/1995 | Degen et al. | 395/2.76 |
| 5,583,652 | A | | 12/1996 | Ware | 386/75 |
| 5,664,044 | A | | 9/1997 | Ware | 386/75 |
| 5,694,521 | A | | 12/1997 | Shlomot et al. | 395/2.71 |
| 5,806,023 | A | * | 9/1998 | Satyamurti | 704/211 |
| 5,809,454 | A | | 9/1998 | Okada et al. | 704/214 |
| 5,810,600 | A | * | 9/1998 | Okada | 434/185 |
| 6,041,038 | A | * | 3/2000 | Aimoto | 370/229 |
| 6,278,387 | B1 | | 8/2001 | Rayskiy | 341/61 |
| 6,359,883 | B1 | * | 3/2002 | Lechleider | 370/389 |
| 6,388,993 | B1 | * | 5/2002 | Shin et al. | 370/233 |
| 6,490,553 | B2 | * | 12/2002 | Van Thong et al. | 704/211 |
| 6,665,751 | B1 | * | 12/2003 | Chen et al. | 710/52 |
| 6,714,541 | B1 | * | 3/2004 | Iyer et al. | 370/392 |
| 6,718,309 | B1 | | 4/2004 | Selly | 704/503 |
| 6,859,435 | B1 | * | 2/2005 | Lee et al. | 370/231 |
| 6,959,075 | B2 | * | 10/2005 | Cutaia et al. | 379/202.01 |
| 6,967,599 | B2 | * | 11/2005 | Choi et al. | 341/61 |
| 6,970,935 | B1 | * | 11/2005 | Maes | 709/230 |
| 6,985,966 | B1 | * | 1/2006 | Gupta et al. | 709/248 |
| 7,039,059 | B2 | * | 5/2006 | Mizusawa et al. | 370/401 |
| 7,047,201 | B2 | * | 5/2006 | Chang | 704/503 |
| 7,117,147 | B2 | * | 10/2006 | Boillot et al. | 704/207 |
| 2006/0277052 | A1 | * | 12/2006 | He et al. | 704/503 |

OTHER PUBLICATIONS

Roucos, et al, "High Quality Time-Scale Modification for Speech", 1985 IEEE, pp. 493-496, 1985.

American National Standard for Telecommunications—"Synchronization Interface Standard", ANSI T1.101-1994, Revision of ANSI T1.101-1987; Feb. 14, 1994; cover pages, index pp. i-vii and pp. 1-29, 1994.

* cited by examiner

*Primary Examiner*—Wing F. Chan
*Assistant Examiner*—Mark A. Mais
(74) *Attorney, Agent, or Firm*—Baker Botts L.L.P.

(57) ABSTRACT

A method for adjusting audio playback is disclosed. The method includes storing audio packets in a jitter buffer, and playing out the audio packets at a first rate. The method further includes determining that a capacity parameter for the jitter buffer is out of compliance with a predetermined standard, and based on the capacity parameter, determining a second rate for playing out the audio packets. The method also includes applying a pitch-invariant time scale modification algorithm to change the rate of playing out the audio packets from the first rate to the second rate.

21 Claims, 2 Drawing Sheets

PITCH INVARIANT SYNCHRONIZATION OF AUDIO PLAYOUT RATES

TECHNICAL FIELD OF THE INVENTION

This invention relates in general to audio communication, and more particularly to techniques for pitch-invariant synchronization of audio playout.

BACKGROUND OF THE INVENTION

Voice over packet (VoP) technology is rapidly emerging as an alternative to circuit-switched telephone systems, such as plain old telephone systems (POTS). One difficulty with the acceptance of VoP is the potential disparity in quality between VoP and POTS systems. Conditions that affect the reliability of network connections, such as high traffic, hardware glitches, and other similar problems, may also interfere with the quality of voice playback in VoP. In many cases, such problems can lead to audible disturbances in voice playout. Customers, however, have high expectations for voice quality established by years of POTS use. Consequently, any technology that increases the quality of VoP playout is extremely valuable.

SUMMARY OF THE INVENTION

In accordance with the present invention, the disadvantages and problems associated with synchronizing playout rates in media gateways have been substantially reduced or eliminated. In particular, certain embodiments of the present invention provide techniques for adaptive, pitch-invariant time scale modification of playout rates. Such techniques provide increased audio quality in voice-over-packet (VoP) communication networks.

In accordance with one embodiment of the present invention, a method for adjusting audio playback includes storing audio packets in a jitter buffer, and playing out the audio packets at a first rate. The method further includes determining that a capacity parameter for the jitter buffer is out of compliance with a predetermined standard, and based on the capacity parameter, determining a second rate for playing out the audio packets. The method also includes applying a pitch-invariant time scale modification algorithm to change the rate of playing out the audio packets from the first rate to the second rate.

In accordance with another embodiment of the present invention, a device includes a jitter buffer, an interface, and a processor. The jitter buffer stores audio packets, and the interface plays out the audio packets at a first rate. The processor determines that a capacity parameter for the jitter buffer is out of compliance with a predetermined standard, and based on the capacity parameter, determines a second rate for playing out the audio packets. The processor then applies a pitch-invariant time scale modification algorithm to change the rate of playing out the audio packets from the first rate to the second rate.

Important technical advantages of certain embodiments of the present invention include improved voice quality in VoP networks. Using pitch-invariant rate modification reduces the audible distortions produced by other techniques for rate compensation, such as discarding packets and filling spaces with synthesized voice data. Moreover, it does not produce unnatural changes in pitch that result from simple increases or decreases in the rate of playout.

Other important technical advantages of certain embodiments of the present invention include better interoperability of network components, especially those with clocks that are offset in frequency. By providing a technique for adjusting playout rates with minimal audible distortion, certain embodiments of the present invention allow media gateways with different processing speeds to be used in the same network. The media gateways exchange rate information with one another and apply suitable rate modification, thereby eliminating audible distortions associated with compensating for differences in playout rate.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
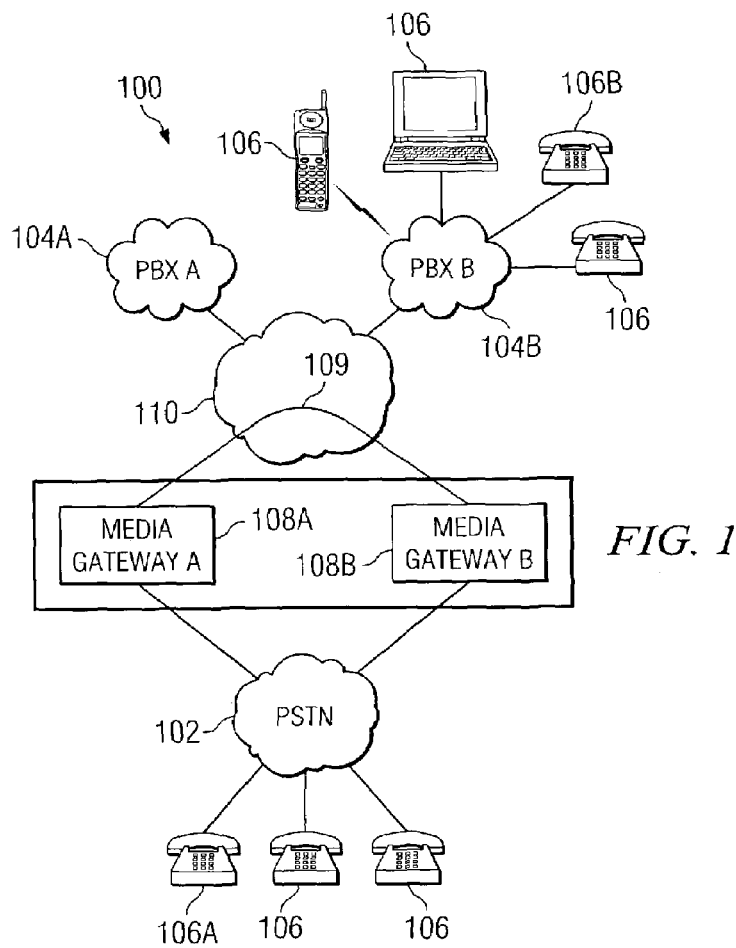
FIG. 1 shows a voice communication system according to a particular embodiment of the present invention.

FIG. 1 is a system 100 that allows endpoints 106 to exchange audio information with one another using voice-over-packet (VoP) technology. In general, system 100 communicates audio information in the form of packets, cells, frames, or other segments or portions of data (collectively referred to as "packets"). System 100 provides techniques for synchronizing playout rates of packetized audio information by adjusting the playout rate according to a pitch-invariant algorithm. System 100 thus allows components to compensate for different processing rates and other variables affecting playout synchronization without substantial audible distortions. In the depicted embodiment, system 100 allows endpoints 106 on the public switched telephone network (PSTN) 102 to communicate with endpoints 106 on packet-based private branch exchanges (PBXs) 104A and 104B (collectively referred to as "PBXs 104"). In this embodiment, an endpoint 106, such as a time-division multiplex (TDM) telephone 106A on the PSTN 102, communicates with a packet-based endpoint 106 that terminates packet streams, such as IP phone 106B. In general, however, system 100 may allow communication between packet-based and non-packet-based networks, between networks of the same general type (for example, gateways 108 used in long-haul packet-based transport between PSTN endpoints 106), between the PSTN 102 and a non-packet-based PBX, between packet-based networks using different communication protocols, or any other form of intercommunication between any combination of packet-based and/or non-packet-based networks. Media gateways 108A and 108B (collectively referred to as "gateways 108") convert audio information from analog or digital circuit-switched signals, such as those associated with plain old telephone signals (POTS), to packetized audio information. Although a particular embodiment has been illustrated, it should be understood that the described techniques may be applied in any packet-based audio communication network, and system 100 depicted in FIG. 1 is only one example.

PBXs 104 represent any network or component that communicates packetized audio information to endpoints 106, not limited to the traditional private branch exchange systems of POTS. PBXs 104 may include any combination of routers, hubs, switches, gateways, or other suitable components for VoP communication, and may use any suitable protocol or method for communicating information, including Internet protocol (IP), asynchronous transfer mode (ATM), synchronous optical network (SONET), wireless communication, wireline communication, fiber-optics, or any other packet-based protocol and/or medium. Endpoints 106 represent any form of audio communication device, including analog telephones, voice over Internet protocol (VoIP) phones, personal computers running communication software, wireless communication devices, or any other suitable device.

Media gateways 108 represent one or more components that receive audio information from an external communication network (PSTN 102 in the depicted embodiment), convert the information into a format suitable for PBX 104A, and communicate the information to PBX 104B. Gateways 108 may include any suitable hardware and/or software for communicating audio information, and in particular, may include components for performing any suitable packetizing, reformatting, buffering, queuing, or other tasks necessary or useful for communicating an accurate reproduction of audio information from one endpoint 106 to another. In the depicted embodiment, gateways 108 communicate with PBXs 104 and with one another using a packet-based communication network 110, but in general, the components of system 100 may communicate according to any suitable communication method, whether packet-based or non-packet-based. The communication connection 109 between gateways 108 over network 110 is also illustrated. Communication connection 109 allows media gateways 108 to exchange information in any suitable format. In a particular embodiment, connection 109 allows gateways 108 to exchange information in the form of network signaling events (NSEs) using any suitable signaling method. For example, RFC2833, which is used in RTP to communicate dual-tone multi-frequency (DTMF) tones, telephony tones, and telephony signaling in Real Time Protocol (RTP), may be used to carry signals. Another example is the use of type-3 packets for ATM adaptation layer 2 (AAL2) networks.

In operation, network conditions such as network delay, packet loss, congestion, and other similar problems may collectively contribute to a degradation in network performance, known as "network jitter." In order to compensate for network jitter, gateway 108 maintains packets in a jitter buffer. Endpoints 106 may also compensate for network jitter to some extent using jitter buffers. Because buffering the packets introduces a delay in playout, the jitter buffer size is selected to collect a sufficient number of packets without being so large that it introduces an undesirable level of delay. Each gateway 108 determines a default playout rate based on the clocking in the particular gateway and determines the jitter buffer size accordingly.

Problems may arise when the clock source in gateway 108A is not matched to the clock source in 108B. An acceptable allowed variation in frequency for each clock source is specified by the American National Standard Institute (ANSI) document T1.101-1987 in parts per million (ppm), and is dependent on the stratum level at which the media gateway operates. For example, the allowed variation is $10^{-11}$ at stratum level 1 and $32 \times 10^{-6}$ ppm at stratum level 4. Due to the allowed variance between the clock sources in gateways 108, clock offsets may produce disparities, which can result in a gateway 108 being presented with more or fewer packets than gateway 108 expects to receive. In existing networks, this may cause gateway 108 to overfill its packet buffer, requiring packets to be discarded, or to play out its buffer capacity too quickly, leaving either noticeable pauses or audio artifacts created by an audio synthesis algorithm filling the space. Such techniques all produce audible distortions in playback.

Unlike existing systems, gateways 108 of system 100 compensate for these distortions by coordinating playout rates using a pitch-invariant time scale modification algorithm. One or both of gateways 108 determine a suitable playout rate for the rate of incoming packets and apply any suitable pitch-invariant time scale modification algorithm to adjust their respective playout rates accordingly. In particular embodiment, gateways 108 may exchange information about relative buffer capacities, playout rates, monitored network conditions, and other suitable information in order to determine a speed factor relative to one another, and determine a playout rate based on the comparison of the relative speed factors. In order to preserve audio quality, gateways 108 may apply the algorithm in a controlled way, such as changing the playout rate in a series of discrete steps. This decreases the chance that the rate change will be perceptible by a listener.

Examples of pitch-invariant time scale modification algorithms known in the art include the synchronous overlap-and-add (SOLA) algorithm described in "High Quality Time-Scale Modification for Speech" by Salim Roucous and Alexander M. Wilgus (IEEE document #CH2118-8/85/0000-0493, 1985). The algorithm allows time-scale modification (TSM) for pitch-invariant modification of signals on different time scales. SOLA is only one example of a suitable pitch-invariant time scale modification algorithm among several known in the art, and any algorithm that permits the adjustment of a rate of audio data playout without changing the pitch of the audio data may be employed. Consequently, the application of pitch-invariant time scale modification algorithms is not limited to SOLA, but may include any of several alternatives. As applied in system 100, gateways 108 determine, either independently or cooperatively, the appropriate manner in which to apply the pitch-invariant time scale modification algorithm to buffered data.

In one example of operation, gateways 108 may monitor the degree to which their respective jitter buffers are filled. When the jitter buffer of one of the gateways 108 exceeds or falls below a particular threshold, gateway 108 applies the time scale modification algorithm to speed up or slow down the playout rate. In another example, gateways 108 can monitor the rate of incoming packets and compare that rate to an expected rate. When the expected rate deviates sufficiently from the monitored rate, gateway 108 may speed up or slow down the playout rate accordingly. In cooperative operation, gateways 108 may exchange information about those calculated quantities using communication connection 109, and all of the information may be used to determine the appropriate time scale modification. For example, the optimum playout rate may be determined by averaging the capacity parameter from gateway 108A and the capacity parameter from gateway 108B, and adjusting the playout rate of each gateway 108 to the average rate of playout.

Figure 2:
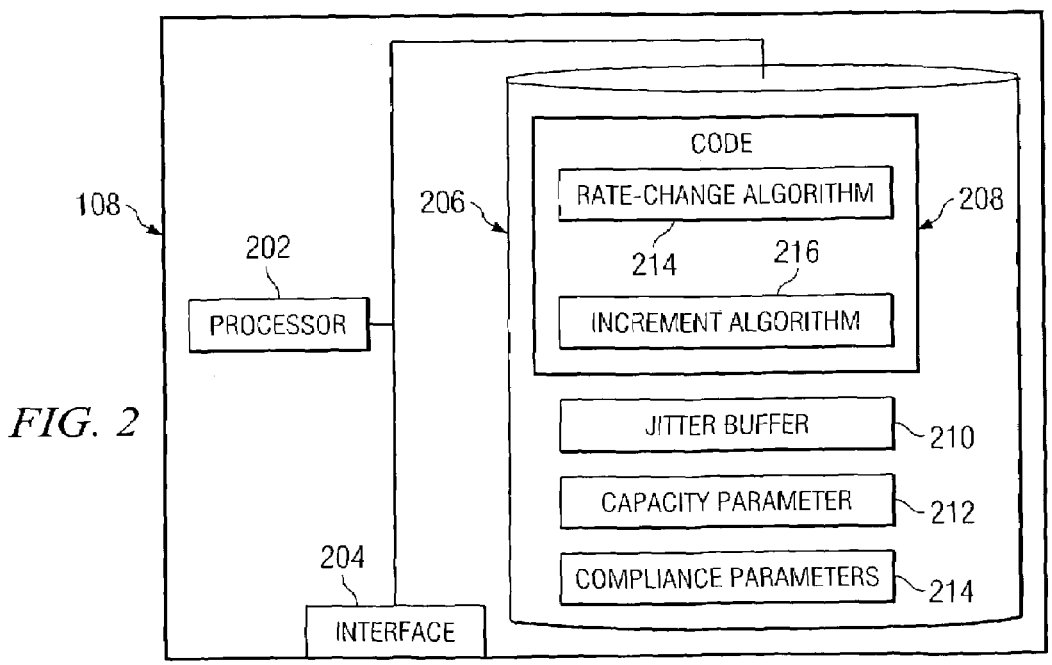
FIG. 2 shows a particular embodiment of a media gateway in the system of FIG. 1.

FIG. 2 shows a particular embodiment of gateway 108. Gateway 108 includes a processor 202, an interface 204, and a memory 206. Processor 202 represents any hardware and/or software for processing information, and may include microprocessors, micro-controllers, digital signal processors (DSP), or other suitable components. Interface 204 represents any port or connection, whether real or virtual, that allows gateway 108 to exchange information with other components of system 100. Interface 204 may represent one or multiple components, and may exchange information according to one or more different communication protocols. For example, interface 204 may exchange information using packet communication, time-division multiplex (TDM), ATM cells, or any other suitable communication method or methods. Memory 208 is any suitable form of information storage, whether volatile or non-volatile. Memory 208 may include optical media, magnetic media, removable media, local memory, remote memory, CD-ROMs, DVD-ROMs, or any suitable local or remote component.

In the depicted embodiment, memory 206 stores code 208, jitter buffer 210, and a capacity parameter 212 for jitter buffer 210. Code 208 represents logical instructions executed by processor 208 to perform various tasks. Code 108 includes a time scale modification algorithm 214 that allows gateway 108 to increase or decrease the rate at which packets are played out of jitter buffer 210. In one embodiment, algorithm 214 does not change the pitch of the audio information stored in the packets. Code 108 may also include an increment algorithm 216 that allows the time scale modification algorithm 214 to be applied in a series of steps, which may be predetermined or calculated amounts of rate change. Jitter buffer 210 represents packets that are stored temporarily by gateway 108 before they are played out of buffer 210. By buffering packets, gateway 108 allows additional time for packets to be received, so that packets that arrive late or out of order may be recovered.

Memory 206 also stores additional information used to assess the performance of jitter buffer and to determine rate changes. Capacity parameter 212 represents one or more suitable metrics that measure the degree to which jitter buffer 212 resources are being used. For example, capacity parameter 212 may indicate the percentage of jitter buffer capacity currently being used, the rate at which the amount of data in jitter buffer 210 is changing, a comparison between the rate of receiving packets and the playout rate, a comparison to a benchmark or expected rate of playout, a comparison of inflow rate to an expected rate based on network jitter or other parameters, or any other suitable measurement. Compliance standards 214 represent any suitable rule, standard, heuristic, or algorithm to determine whether the current performance of jitter buffer 210 is adequate or whether a change in playout rate is required. Compliance standards 214 may include minimum or maximum threshold values for capacity parameter 212, expected or theoretical rates of packet arrival or playout rate, average playout rates calculated by comparison with other gateways 108, or any other suitable rule or measurement.

In operation, gateway 108 receives audio packets, stores them in jitter buffer 210, and communicates them one by one to components of PBXs 104, gateways 108, or other destinations. During the process of receiving and communicating packets, gateway 108 monitors the capacity of jitter buffer 210 and periodically adjusts capacity parameter 212 to reflect the current state of jitter buffer 210. When capacity parameter 212 fails to meet compliance standards 214, gateway 108 applies time scale modification algorithm 214 in order to bring capacity parameter 212 back into compliance with standards 214. Depending on the degree of rate change required, gateway 108 may apply time scale modification algorithm 214 in a series of steps using increment algorithm 216. For example, if a sudden burst of packets is received, gateway 108 may partially compensate by increasing the playout rate to a certain degree. In that case, if the bursty situation subsequently stabilizes, gateway 108 will not have overcompensated for a transitory circumstance, which could possibly reduce audio quality. If the bursty situation persists, gateway 108 continues the rate increase to match the rate of incoming packets.

Figure 3:
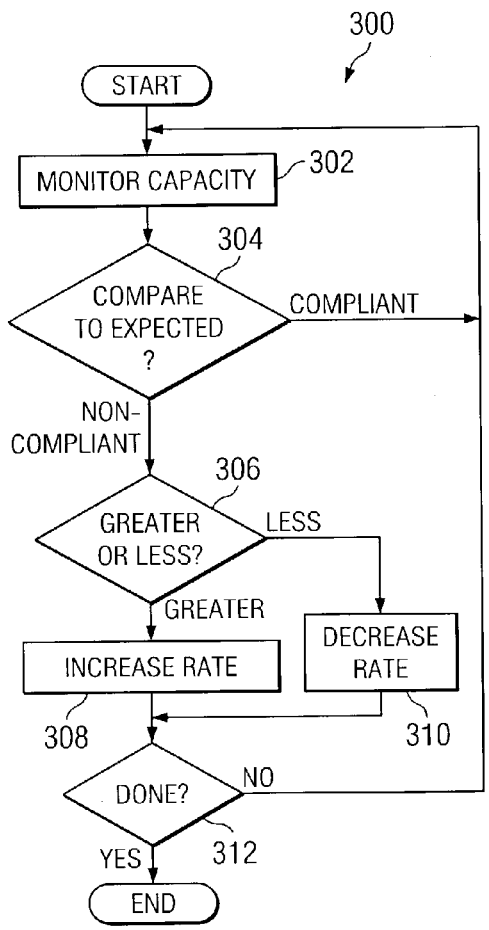
FIG. 3 is a flow chart showing one example of a method of operation for a media gateway.

FIG. 3 is a flow chart 300 illustrating one example of rate correction by gateway 108, in which gateway 108 independently determines a rate change without exchanging information with other gateways 108. Gateway 108 monitors the capacity of jitter buffer 210 and maintains capacity parameter 212 at step 302. A decision step 304, gateway 108 compares capacity parameter 212 with compliance standards 214 to determine whether capacity parameter 212 is acceptable. If capacity parameter 212 is compliant with standards 214, gateway 108 continues to monitor capacity from step 302. If capacity parameter 212 is non-compliant, gateway 108 adjusts its playout rate.

To adjust the playout rate, gateway 108 determines whether capacity parameter 212 indicates that the use of jitter buffer 210 capacity is greater than acceptable or less than acceptable. If jitter buffer 210 is being overused, gateway 108 applies a pitch-invariant time scale modification algorithm to increase the playout rate of jitter buffer 210 at step 308. If jitter buffer 210 is being underused, gateway 108 applies the time scale modification algorithm to reduce the playout rate at step 310. If gateway 108 is still receiving audio packets at decision step 321, then gateway 108 repeats the method from step 302. Otherwise, the method is complete.

Although a particular method has been described, numerous variations and additions are possible without changing the overall operation of the method. For example, the method may be embodied in voice playout devices other than media gateways 108. With respect to the particular method described, gateway 108 may perform any additional storing or calculating steps to determine and/or maintain useful information, such as storing a current playout rate and updating the stored playout rate whenever the rate is changed. Gateway 108 may also apply the time scale modification algorithm in a series of steps or otherwise limit the degree of rate change in order to make the rate change less noticeable.

Figure 4:
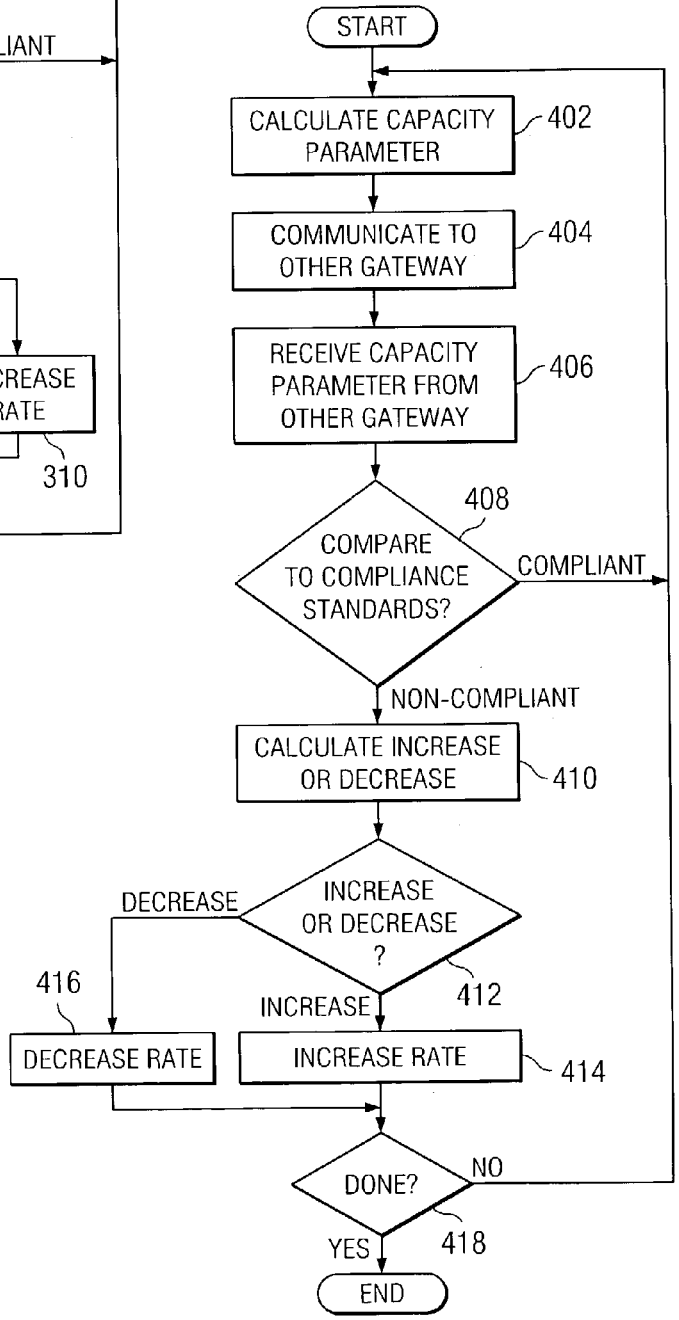
FIG. 4 is a flow chart showing a cooperative method of operation between multiple media gateways.

FIG. 4 shows an example of a method of cooperative operation of gateways 108. Gateway 108A calculates capacity parameter 212A at step 402, and communicates the value to gateway 108B at step 404. Gateway 108A receives a capacity parameter 212B calculated by gateway 108B at step 406. Gateway 108A determines whether capacity parameters 212 meet compliance standards 214 at step 408. If capacity parameters 212 meet compliance standards 214, gateway 108A continues to exchange capacity parameter information with gateway 108B from step 402.

If capacity parameters 212 do not fall within compliance standards 214, gateway 108 calculates an increase or decrease for the playout rate based on capacity parameters 212. If a rate increase is required at decision step 412, gateway 108 applies the time scale modification algorithm to accelerate the playout at step 414. If a decrease is required at decision step 412, gateway 108 applies the time scale modification algorithm to reduce the playout rate at step 416. If no change is required, gateway 108 continues to calculate capacity parameter 212 at step 402 and repeats the method from there. Once any rate changes are made, gateway 108 determines whether it is continuing to receive audio packets at step 418. If packets are still being received, gateway 108 repeats the method from step 402. Otherwise, the method is at an end.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for adjusting audio playback, comprising:
storing a plurality of audio packets in a jitter buffer;
playing out the audio packets at a first rate;
calculating at a first media gateway a first capacity parameter for the jitter buffer;
communicating the first capacity parameter to a second media gateway;
receiving a second capacity parameter from the second media gateway having a second jitter buffer;
comparing the first capacity parameter to the second capacity parameter;
based on the comparison, determining whether the first capacity parameter is out of compliance with a predetermined standard;
if the first capacity parameter is out of compliance with the predetermined standard, determining a second rate for playing out the audio packets; and
applying a pitch-invariant time scale modification algorithm to change the rate of playing out the audio packets from the first rate to the second rate and to coordinate the second rate with the playout rate of the second media gateway.

2. The method of claim 1, wherein:
the first and second capacity parameters comprise a percentage of the respective jitter buffers capacities that are filled; and
the first capacity parameter is determined to be out of compliance when the first capacity parameter falls below a first threshold value or above a second threshold value.

3. The method of claim 1, wherein:
the first and second capacity parameters comprise a measured rate of packet arrival; and
the step of determining that the first capacity parameter is out of compliance is based on a comparison of the first capacity parameter with an expected rate of packet arrival.

4. The method of claim 1, wherein the step of applying comprises:
calculating a difference between the first rate and the second rate; and
applying the algorithm to change the rate of playing out the audio packets by a predetermined increment less than the difference.

5. The method of claim 1, wherein:
the method is implemented in the first media gateway;
the first capacity parameter comprises a first processing rate for the first media gateway; and
the step of determining that the first capacity parameter is out of compliance comprises comparing the first processing rate to a second processing rate of the second media gateway.

6. The method of claim 1, wherein the pitch-invariant time scale modification algorithm comprises a synchronous overlap-and-add (SOLA) algorithm.

7. A device, comprising:
a jitter buffer operable to store audio packets;
an interface operable to play out the audio packets at a first rate; and
a processor operable to:
calculate at a first media gateway a first capacity parameter for the jitter buffer;
communicate the first capacity parameter to a second media gateway;
receive a second capacity parameter from the second media gateway having a second jitter buffer;
compare the first capacity parameter to the second capacity parameter;
based on the comparison, determine whether the first capacity parameter is out of compliance with a predetermined standard;
if the first capacity parameter is out of compliance with the predetermined standard, determine a second rate for playing out the audio packets; and
apply a pitch-invariant time scale modification algorithm to change the rate of playing out the audio packets from the first rate to the second rate and to coordinate the second rate with the playout rate of the second media gateway.

8. The device of claim 7, wherein:
the first and second capacity parameters comprise a percentage of the respective jitter buffers capacities that are filled; and
the first capacity parameter is determined to be out of compliance when the first capacity parameter falls below a first threshold value or above a second threshold value.

9. The device of claim 7, wherein:
the first and second capacity parameters comprise a measured rate of packet arrival; and
the first capacity parameter is determined to be out of compliance based on a comparison of the first capacity parameter with an expected rate of packet arrival.

10. The device of claim 7, wherein the processor is further operable to:
calculate a difference between the first rate and the second rate; and
apply the algorithm to change the rate of playing out the audio packets by a predetermined increment less than the difference.

11. The device of claim 7, wherein:
the device is the first media gateway;
the first capacity parameter comprises a first processing rate for the first media gateway; and
the processor determines that the first capacity parameter is out of compliance by comparing the first processing rate to a second processing rate of the second media gateway.

12. The device of claim 7, wherein the pitch-invariant time scale modification algorithm comprises a synchronous overlap-and-add (SOLA) algorithm.

13. A method for adjusting a playout rate of audio packets from a jitter buffer, comprising:
calculating at a first media gateway a first capacity parameter for a first jitter buffer;
communicating the first capacity parameter to a second media gateway;
receiving a second capacity parameter from the second media gateway having a second jitter buffer;
comparing the first capacity parameter for the first jitter buffer in the first media gateway to the second capacity parameter for the second jitter buffer in the second media gateway;
determining based on the comparison that a first processing rate of the first media gateway does not match a second processing rate of the second media gateway;
calculating, based on the comparison, a new rate of playout for packets for the first jitter buffer;
applying a pitch-invariant time scale modification algorithm to change a present rate of playout for the first jitter buffer to the new rate of playout and to coordinate the new rate with the second processing rate of the second media gateway.

14. The method of claim 13, wherein the first and second capacity parameters each comprise an amount of the respective jitter buffer capacity used.

15. The method of claim 13, wherein the step of calculating comprises:
   determining an average rate of playout for the media gateways based on the first and second capacity parameters; and
   selecting the average rate of playout as the new rate of playout.

16. The method of claim 13, wherein:
   the first capacity parameter comprises an amount of used capacity of the first jitter buffer; and
   the second capacity parameter comprises an expected amount of used capacity for the second jitter buffer.

17. A device, comprising:
   means for storing a plurality of audio packets in a jitter buffer;
   means for playing out the audio packets at a first rate;
   means for calculating at a first media gateway a first capacity parameter for the jitter buffer;
   means for communicating the first capacity parameter to a second media gateway;
   means for receiving a second capacity parameter from the second media gateway having a second jitter buffer;
   means for comparing the first capacity parameter to the second capacity parameter;
   means for determining, based on the comparison, whether the first capacity parameter is out of compliance with a predetermined standard;
   if the first capacity parameter is out of compliance with the predetermined standard, means for determining a second rate for playing out the audio packets; and
   means for applying a pitch-invariant time scale modification algorithm to change the rate of playing out the audio packets from the first rate to the second rate and to coordinate the second rate with the playout rate of the second media gateway.

18. The device of claim 17, wherein:
   the first and second comprises parameters comprise a percentage of the respective jitter buffer capacities that are filled; and
   the first capacity parameter is determined to be out of compliance when the first capacity parameter falls below a first threshold value or above a second threshold value.

19. The device of claim 17, wherein:
   the first and second capacity parameters comprise a measured rate of packet arrival; and
   the means for determining that the first capacity parameter is out of compliance is based on a comparison of the first capacity parameter with an expected rate of packet arrival.

20. The device of claim 17, wherein the means for applying comprises:
   means for calculating a difference between the first rate and the second rate; and
   means for applying the algorithm to change the rate of playing out the audio packets by a predetermined increment less than the difference.

21. The device of claim 17, wherein the pitch-invariant time scale modification algorithm comprises a synchronous overlap-and-add (SOLA) algorithm.

* * * * *